United States Patent [19]
Carriere

[11] Patent Number: 5,122,100
[45] Date of Patent: Jun. 16, 1992

[54] POWERTRAIN ASSEMBLY HAVING A T-DRIVE CONFIGURATION

[75] Inventor: Donald L. Carriere, Livonia, Mich.

[73] Assignee: Ford Motor Company, Dearborn, Mich.

[21] Appl. No.: 506,144

[22] Filed: Apr. 9, 1990

[51] Int. Cl.[5] .......................................... B60K 17/00
[52] U.S. Cl. .................................... 475/198; 74/409
[58] Field of Search .................. 475/200, 198, 205; 74/409, 416, 417, 420, 15.63, 730.1; 403/259, 261

[56] References Cited

U.S. PATENT DOCUMENTS

| | | | |
|---|---|---|---|
| 3,359,819 | 12/1967 | Veillette et al. | 74/409 |
| 4,323,352 | 4/1982 | Warren et al. | 74/417 |
| 4,368,649 | 1/1983 | Vahratian et al. | 74/695 |
| 4,509,389 | 4/1985 | Vahratian et al. | 74/695 |
| 4,629,354 | 12/1986 | Freese | 403/259 |
| 4,640,147 | 2/1987 | Yasukawa et al. | 74/409 |
| 4,745,823 | 5/1988 | Morita et al. | 74/409 |
| 4,767,230 | 8/1988 | Leas, Jr. | 403/259 |

FOREIGN PATENT DOCUMENTS 654326 12/1937 Fed. Rep. of Germany.
762655 6/1941 Fed. Rep. of Germany.
WO86/02049 4/1986 PCT Int'l Appl..
2092533 8/1982 United Kingdom.

OTHER PUBLICATIONS

"Auto Notizie", Cizeta Moroder Company of Italy May 1989.

Primary Examiner—Rodney H. Bonck
Assistant Examiner—Ryan W. Massey
Attorney, Agent, or Firm—Frank G. McKenzie; Roger L. May

[57] ABSTRACT

A T-drive assembly comprising an internal combustion engine with a crankshaft adapted to be mounted in a vehicle in a direction transverse to the fore-and-aft geometric vehicle axis, a geared transmission having an axis perpendicular to the axis of the crankshaft, and a cross-axis drive between the crankshaft and torque input elements of the transmission including zero backlash bevel gears, one bevel gear being secured to a mid-position on the crankshaft and the other having a tapered hub in frictional driving relationship with a tapered torque input shaft for the transmission torque input elements.

4 Claims, 6 Drawing Sheets

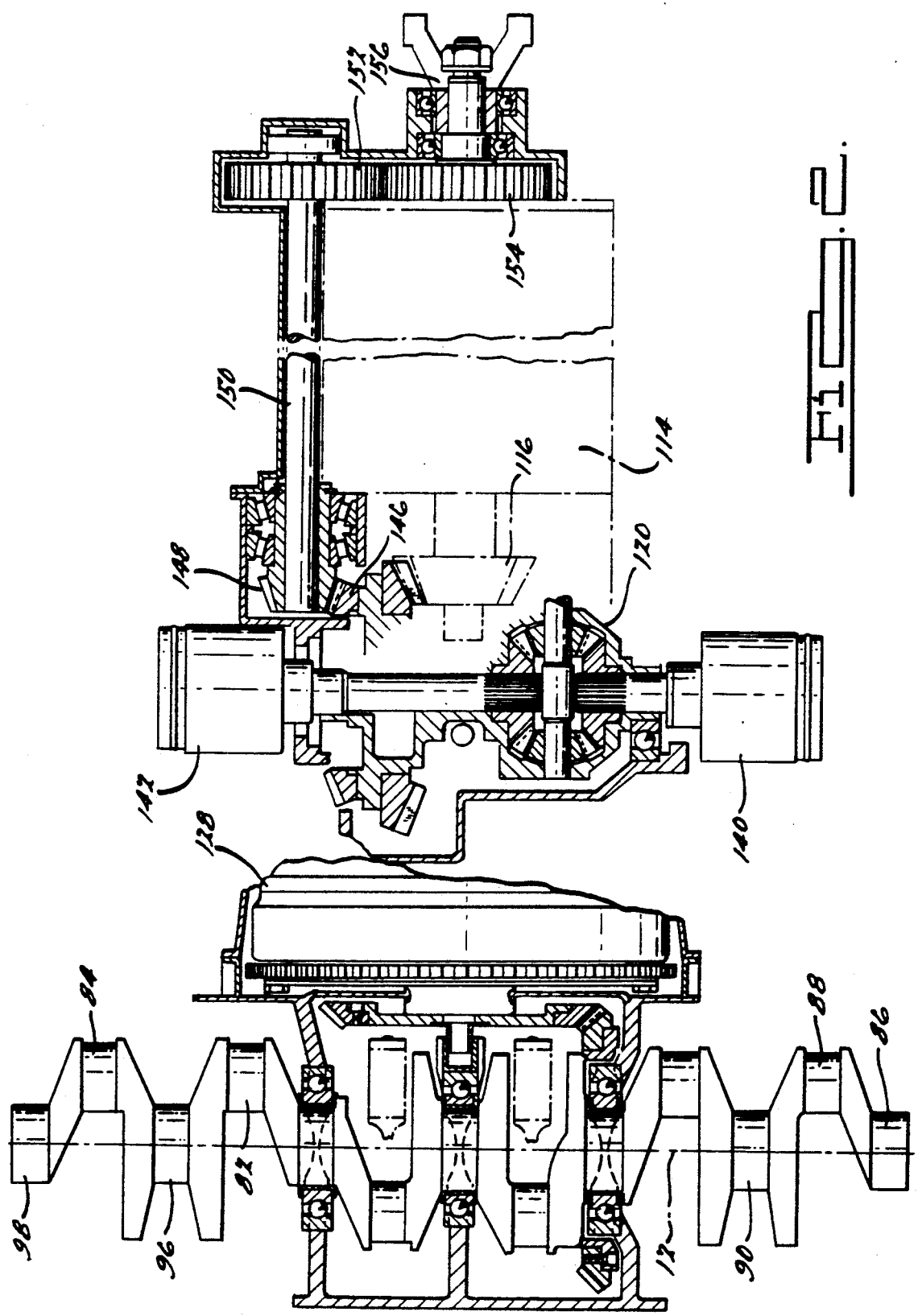

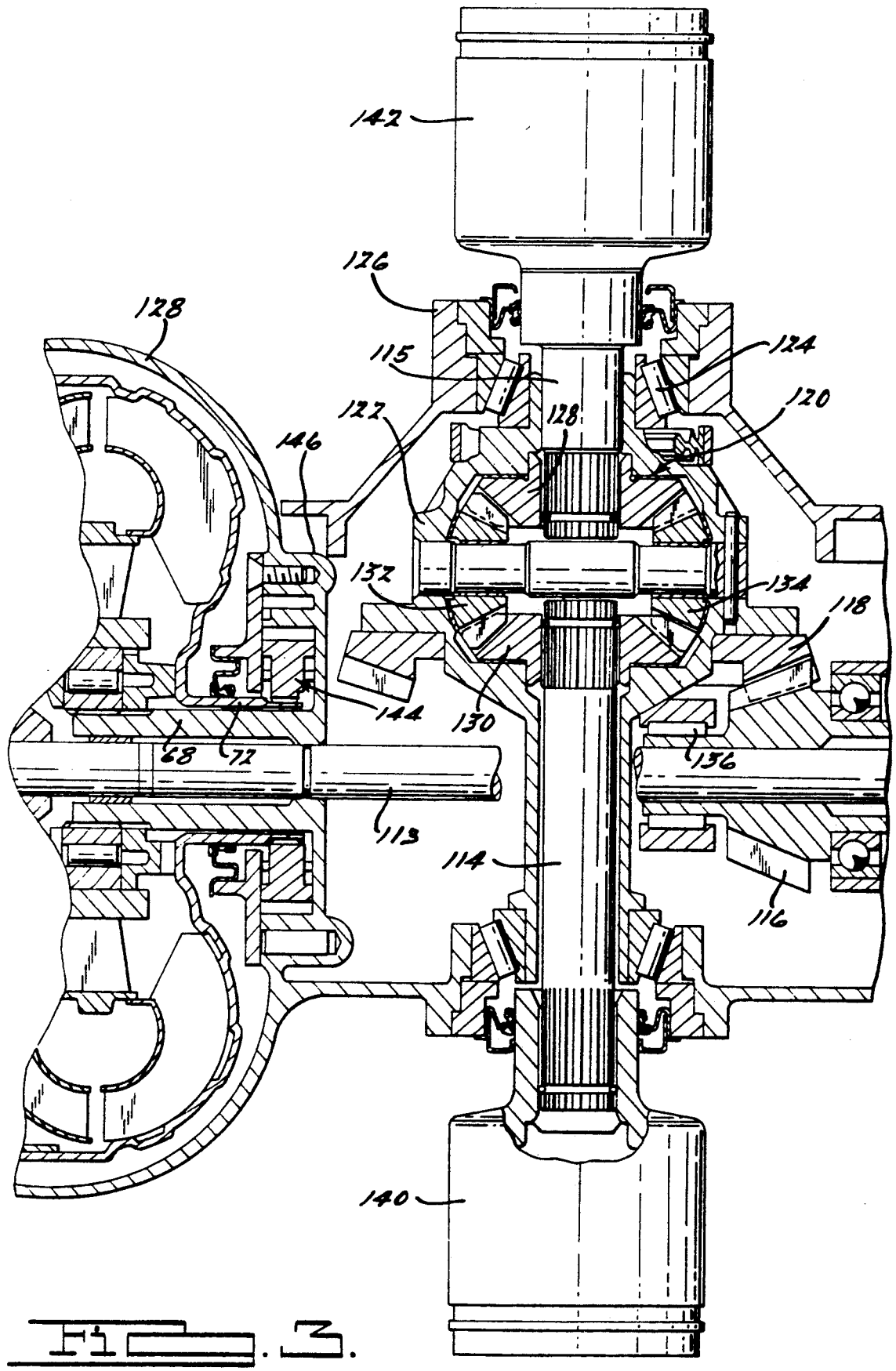

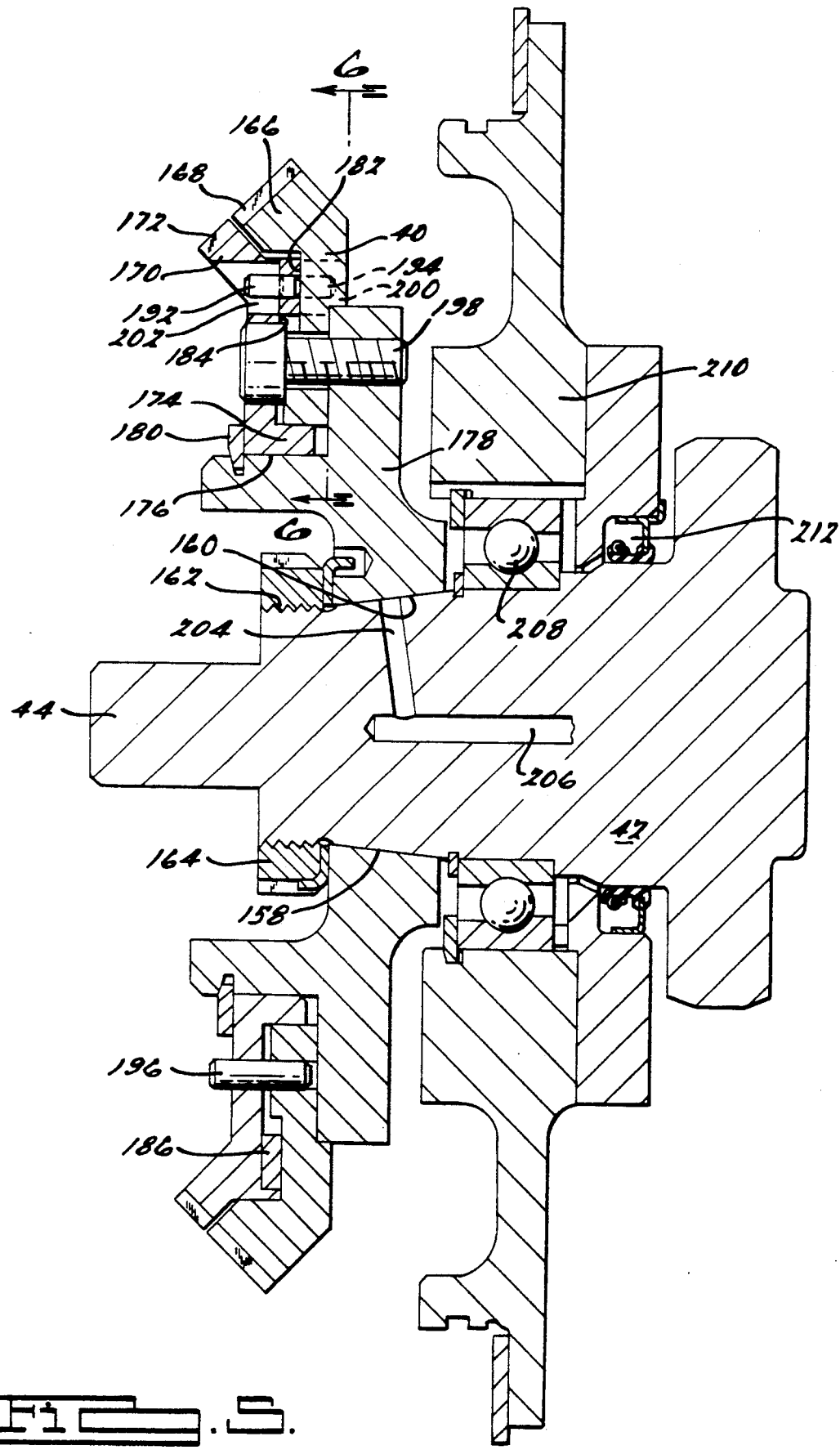

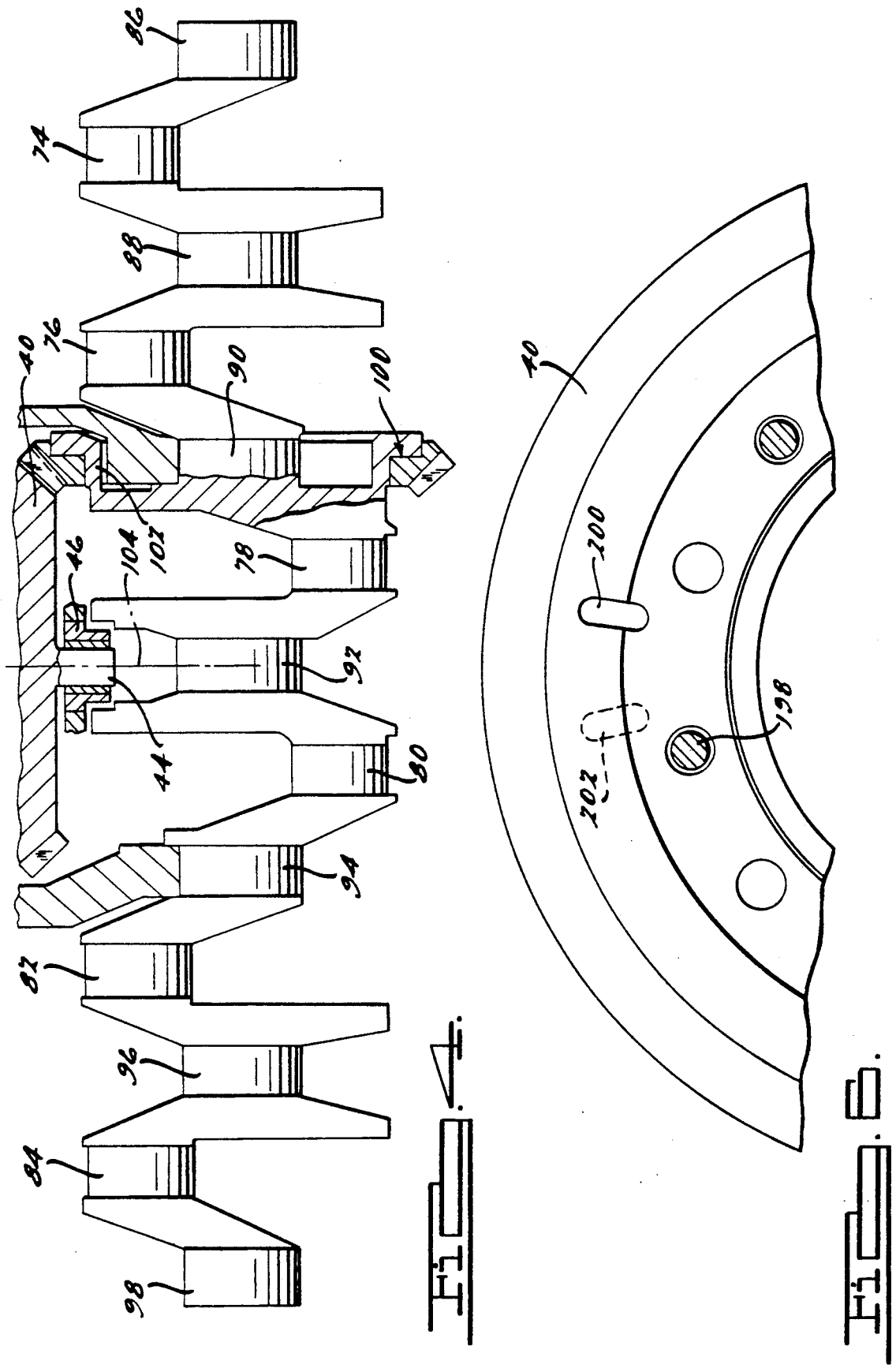

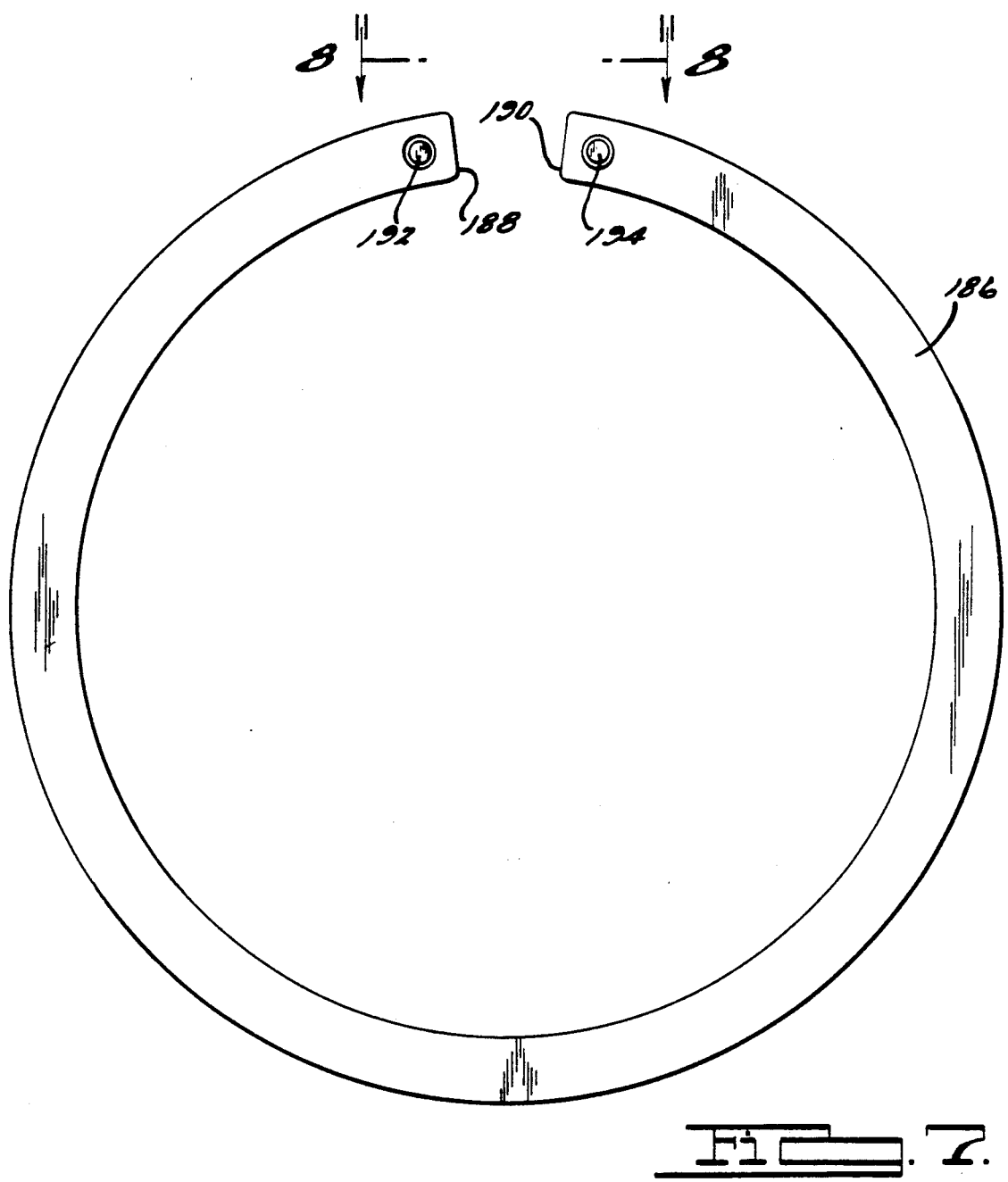
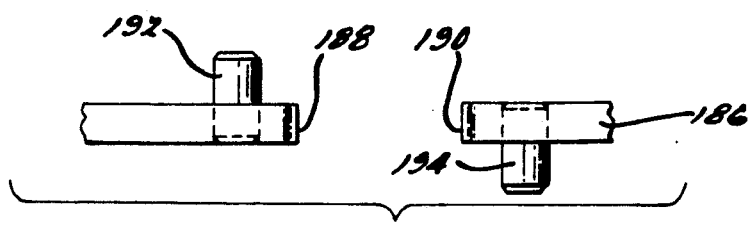

POWERTRAIN ASSEMBLY HAVING A T-DRIVE CONFIGURATION

TECHNICAL FIELD

The invention relates to automotive vehicle powertrains having an internal combustion engine and multiple ratio gearing arranged in a cross-axis disposition to form a compact assembly.

BACKGROUND ART

The invention is an improvement in the invention disclosed in my pending patent application entitled "POWERTRAIN ASSEMBLY WITH CROSS-AXIS DISPOSITION OF THE ENGINE CRANKSHAFT AND THE TRANSMISSION TORQUE INPUT SHAFT", which was filed Jan. 29, 1990, Ser. No. 471,759.

The invention of my copending application, which is assigned to the assignee of this invention, is adapted particularly to be used in a front-wheel drive vehicle in which the axis of the internal combustion engine is mounted in the direction of the vehicle center plane in a fore-and-aft direction. Multiple ratio transmission gearing is arranged with the axis of the gearing disposed perpendicularly with respect to the axis of the engine crankshaft to form a T-drive configuration. This makes it possible to design the transmission and engine package with minimum space requirements, thereby improving the styling options for the vehicle designer and reducing the intrusion of the engine and transmission assembly into the passenger and cargo space for the vehicle.

Because of the reduced powertrain dimensions made possible by such a T-drive configuration, the vehicle exterior size can be reduced, which results in weight reduction, a reduction in the number of components, and reduced manufacturing cost.

The T-drive configuration of the invention described in my copending application is achieved by locating an engine crankshaft gear at a mid-crankshaft position on a nodal point for torsional vibrations in the crankshaft. This divides the crankshaft effectively into two crankshaft portions, each of which has its own natural torsional frequency. The amplitudes of the torsional vibrations that occur in the crankshaft are reduced substantially because of the strategic position of the engine crankshaft gear.

The engine dynamic forces that are transmitted to the crankshaft and the loading on the gear that results from the engine firing forces and torques have a minimal effect on the gear tooth loading.

A T-drive arrangement of the kind described in my copending patent application is unlike other transaxle arrangements presently used in the automotive industry, such as the transaxle described in U.S. Pat. Nos. 4,509,389 and 4,368,649, each of which is assigned to the assignee of my invention. In the case of the drivelines described in these prior art references, the engine crankshaft axis is arranged transversely with respect to the vehicle center plane rather than in the fore-and-aft direction, as in the case of the present invention. Further, the torque output shaft for the transmission gearing is arranged in spaced, parallel relationship with respect to the crankshaft axis.

The crankshaft gear in the powertrain assembly of my copending application engages a transmission torque input gear. The gear teeth for each of the gears are beveled so that the axis of the transmission torque input gear and the crankshaft axis are perpendicular, one with respect to the other. One of the possible drawbacks for cross-axis gearing of this kind is the tendency for the cross-axis gears to emanate an undesirable noise because of variations in the tooth geometry for the meshing gear teeth. Furthermore, the crankshaft gear itself is subjected to unusual forces because of firing forces of the engine and severe transient torque fluctuations that occur in the direct-driving connection between the crankshaft and the transmission input gearing. Some of the undesirable gear noise, sometimes referred to as gear rattle, is caused by backlash between meshing gear teeth of the crankshaft gear and the torque input gear for the transmission. Further, the severe forces applied to the gears, because of transient torque fluctuations and engine firing forces tend to reduce the durability of the driving connection between the transmission input gear and the transmission input shaft itself.

If the connection between the input shaft and the transmission torque gear input is a spline connection, it is possible that the unusual forces that are transmitted through the gearing will cause failure of the spline teeth. If the driving connection is established by a keyway, it is possible that the unusual forces transmitted through the gearing will destroy the key. In either case, the overall durability of the powertrain is reduced.

DISCLOSURE OF THE INVENTION

My invention overcomes noise problems associated with a cross-axis gearing arrangement for a T-drive of the kind described in preceding paragraphs by eliminating backlash between the torque transmitting gearing, thereby significantly reducing the tendency for the gearing to develop an audible gear noise or gear rattle. My invention, furthermore, will improve the durability of the driving connection between the gear and the torque input shaft of the transmission by eliminating the necessity for drive splines or a key and slot connection to establish a torque flow path between the transmission input gear and the input shaft for the multiple ratio transmission.

Elimination of backlash in my improved T-drive assembly is accomplished by forming the transmission torque input gear of the cross-axis gearing for the engine crankshaft in two parts, each part having peripheral spiral bevel gear teeth. An internal annular recess is formed between the bevel gear sections for accommodating a C-spring that is adapted to establish circumferential torque on the bevel gear portions.

The peripheral teeth on one bevel gear portion cooperate with the bevel gear teeth on the companion bevel gear portion to define a single set of spiral bevel gear teeth adapted to engage the bevel gear teeth on the crankshaft gear.

Gear assemblies having displaceable gear portions for eliminating backlash are referred to in the industry as scissor gears. Examples of known scissor gear designs are described in U.S. Pat. Nos. 4,745,823, 3,359,819, and 4,640,147. These patents disclose spur gear teeth wherein the teeth are formed by two gear portions that are subjected to a tangential spring force. The gear portions cooperate to establish a conjugate driving relationship with respect to a drive pinion. The tendency of the spring to establish circumferential displacement of the teeth of the gear portions eliminates backlash at the gear tooth involute faces.

The transmission torque input bevel gear of the T-drive of my invention incorporates separate bevel gear portions with a spring means that is particularly adapted to establish opposed torques on the bevel gear parts, which tends to eliminate backlash in the cross-axis gearing. The hub of the torque input bevel gear is connected drivably to the input shaft for the multiple ratio gearing without the necessity for using spline teeth or a key-and-slot connection or some similar driving connection that would be susceptible to destruction due to the forces created by the internal combustion engine. This is achieved by providing a hub with a tapered opening on the bevel gear which registers with a tapered section on the torque input shaft for the multiple ratio gearing. Internal and external tapered hub surfaces establish a frictional driving connection between the shaft and the bevel gear as the latter is assembled on the shaft with a force fit, thereby eliminating stress points that would be established if a spline connection or a key-and-slot connection or the like were to be used.

BEST MODE FOR CARRYING OUT THE INVENTION

FIG. 2 is a cross-sectional view of the T-drive taken along a plane that contains the engine crankshaft.

FIG. 3 is a partial cross-sectional assembly view of the T-drive showing a driving connection between the torque output pinion for the multiple ratio gearing and the torque input gear for an output differential unit for front-wheel drive axle half shafts in a front-wheel drive vehicle.

FIG. 4 is an elevation view, partly in cross-section, showing a six cylinder engine crankshaft and a crankshaft gear for the cross-axis gearing.

FIG. 5 is an enlarged cross-sectional subassembly view of the zero backlash gear adapted to be mounted at the torque input side of the multiple ratio gearing.

FIG. 6 is an end view of the structure of FIG. 5 as seen from the plane of section line 6—6 of FIG. 5.

FIG. 7 is a detailed elevation view of a C-spring for use in the zero backlash gear illustrated in FIG. 5.

FIG. 8 is a partial end view of the C-spring of FIG. 7 as seen from the plane of section line 8—8 of FIG. 7.

PARTICULAR DESCRIPTION OF THE INVENTION

The Overall Assembly

Figure 1:
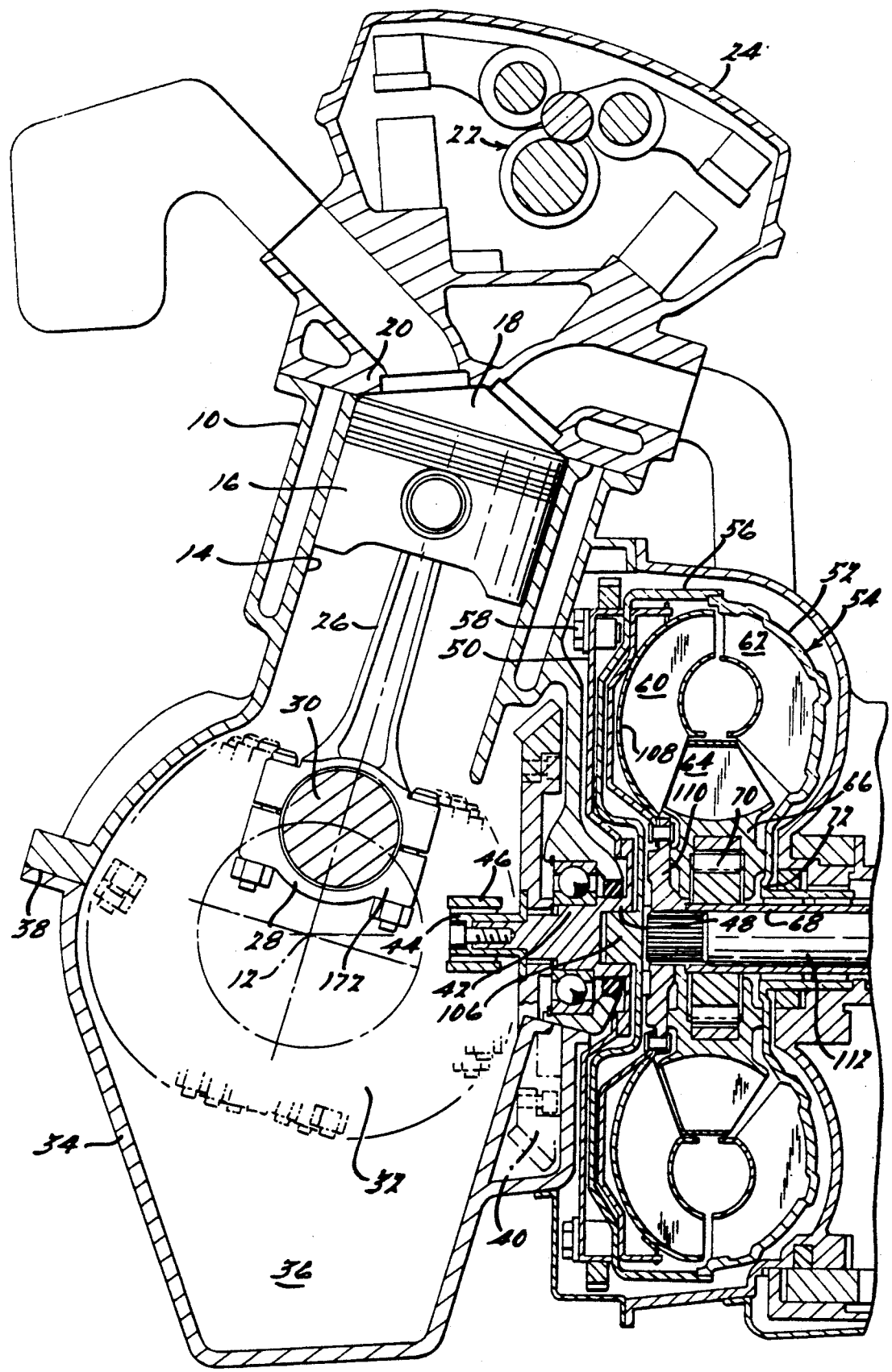
FIG. 1 is an assembly view of a T-drive taken along a plane perpendicular to the axis of the engine crankshaft.

In FIG. 1, the numeral 10 designates the cylinder block for an internal combustion engine in a front-wheel drive vehicle powertrain package. The section plane of FIG. 1 is taken along a plane perpendicular to the axis of the crankshaft, the latter being designated by reference character 12. A plurality of cylinders 14 is formed in the cylinder block 10. Each cylinder has a piston 16 which reciprocates in a cylinder 14. A combustion chamber 18 is defined by the upper surface of each piston and the surrounding cylinder head 20.

The cam shaft and valve operators are generally designated by reference character 22. These are located in the upper portion 24 of the cylinder head 20.

Each piston 16 is connected to the crankshaft bearing portion by a piston rod 26, the end of which carries a bearing cap 28 which surrounds the crank portion 30 of the crankshaft. An envelope of crankshaft positions is generally designated by reference character 32. The extremities of the lower portion of the connecting rod 26, as the crank portion 30 travels in its circular path, are illustrated in FIG. 1 in multiple positions in order to indicate the clearance between the crank end of the connecting rod 26 and the surrounding walls of the engine block 10. The engine block has secured to its lower extremity an oil pan 34 which defines a sump 36.

Pan 34 is bolted to the lower surface 38 of the cylinder block 10.

The crankshaft gear for the cross-axis drive is not illustrated in FIG. 1. The torque input gear that meshes with the crankshaft gear is shown at 40. As will be explained subsequently with reference to FIG. 5, gear 40 is secured to torque input shaft 42 for the transmission. Shaft 42 is journalled at its inboard end 44 on a bearing support 46 which forms a part of the engine block 10.

The inboard end 48 of the torque input shaft 42 is connected to drive plate 50 for the impeller 52 of a hydrokinetic torque converter 54. The impeller 52 comprises a housing 56 which is secured to the outer periphery of the drive plate 50 by bolts 58.

The impeller housing encloses a bladed turbine 60, which is situated in toroidal fluid flow relationship with respect to the impeller radial outflow passages defined by impeller blades 62. A bladed stator 64 is situated in conventional fashion between the flow entrance section of the impeller blades and flow exit section of the turbine 60.

Stator 64 has a hub 66 mounted on stator sleeve shaft 68, which will be described subsequently with reference to FIG. 3. An overrunning brake 70 is disposed between the hub 66 of the stator and the stationary sleeve shaft 68.

The impeller 52 includes a hub 72 which is journalled on the stationary sleeve shaft 68.

In FIG. 4, the crankshaft is shown in elevation. It includes six cranks, one crank for each of six cylinders. The cranks are separately identified by reference characters 74 through 84. The engine block 10 has bearing supports, formed integrally with the bearing block, which register with bearing portions on the crankshaft to rotatably support the crankshaft in known fashion. The bearing portions on the crankshaft are identified separately by reference characters 86 through 98.

Shown in FIG. 4 is a crankshaft bevel gear 100, which is carried by a crankshaft bevel gear support 102. It may be secured to the support 102 by welding or by other manufacturing techniques.

Gear 100 has spiral bevel teeth that mesh with bevel gear teeth formed on bevel gear 40. The pitch radius of the bevel gear 40 is such that the centerline of the gear 40 is coincident with the midpoint of the crankshaft, the centerline being designated by reference numeral 104.

As seen in FIG. 1, the hub of the impeller shell is piloted at 106 in a pilot opening formed in the outboard end of the input shaft 42.

Turbine 60 includes a turbine shroud 108 that has a hub 110 splined to turbine shaft 112.

As seen in FIG. 3, turbine shaft 112 extends perpendicularly with respect to the axis of halfshaft 114 and companion halfshaft 115 in a front-wheel drive powertrain assembly for a wheeled vehicle.

The Right Angle Drive

As explained in my copending patent application previously identified, the turbine shaft serves as a torque input shaft for a multiple ratio power transmission mechanism. This is schematically illustrated in FIG. 2 and identified by reference character 114. The torque output shaft for the transmission 114 is connected to drive pinion 116, illustrated in FIG. 2 as well as in FIG. 3.

Pinion 116 meshes with differential ring gear 118 of a transaxle differential unit 120. Ring gear 118 is carried by differential housing 122, which is journalled by bearing 124 in a right-angle drive housing 126 situated between torque converter housing 128 and the housing for transmission 114. This arrangement also is described in my copending application identified previously.

Axle shaft 115 is splined to differential side gear 128, and axle shaft 113 is splined to differential halfshaft 130. Each side gear meshes with pinions 132 and 134 carried by a pinion shaft that is secured to the housing 122.

The outboard end of the drive pinion 116 is journalled at 136 in a bearing support that forms a part of the right-angle drive housing 126.

Axle shafts 113 and 115 are adapted to be connected to axle halfshafts for the front traction wheels of a front-wheel drive vehicle by universal couplings 140 and 142, respectively.

A positive displacement transmission pump 144 is connected drivably to the impeller hub 72. It is enclosed by pump housing portion 146, which forms a part of the converter housing 128.

Engine crankshaft torque is delivered to the bevel pinion 40, which drives the impeller. Turbine torque developed in the torque converter 54 is transferred through the shaft 112 to torque input elements of the transmission 114. In the embodiment of FIG. 3, the output torque on the output drive gear 116 engages differential ring gear 118, as explained with reference to FIG. 3. The structure of FIG. 2 differs from that of FIG. 3, however, because the FIG. 2 structure includes a four-wheel drive adaptation. This comprises a secondary ring gear 146, which meshes with bevel pinion 148 drivably connected to driveshaft 150. Final drive gears 152 and 154 transfer torque from driveshaft 150 to the rear traction wheels through a suitable U-joint illustrated schematically at 156.

Except for the rear-wheel drive structure for the FIG. 2 embodiment, the embodiments of FIGS. 3 and 2 are of the same design. Thus, similar reference characters have been applied to indicate elements that are common to both embodiments. The crankshaft gear 100 and the torque input pinion 40, as shown in FIG. 4, are subjected to repeated engine firing torque impulses as well as to stresses due to engine crankshaft vibrations. It is necessary, therefore, for the bevel gear teeth of the crankshaft gear and the gear 40 to establish conjugate action with zero backlash. This feature, as well as the hub construction for the gear 40, will be described with reference to FIGS. 5–8.

The Cross-Axis Gears

FIG. 5 shows a zero backlash gear 40 which may be used in the assembly illustrated in FIG. 1. FIG. 1 shows a gear 40 in the overall combination merely to illustrate the operating environment for the gear of FIG. 5. The structural illustration of FIG. 1 does not include an illustration of the tapered hub portion nor the double bevel gear teeth shown in FIG. 5

In FIG. 5, it is seen that the hub 42 at its outboard end is provided with a tapered section 158, and the cooperating hub portion of the gear 40 has a tapered opening 160, which is adapted to register with tapered portion 158 when the gear 40 is assembled on the hub 42. The hub 42 is provided also with a threaded portion 162 on which is threaded a lock nut 164. When the lock nut 164 is tightened, a force is exerted on the gear 40, thereby establishing a press fit at the cooperating tapered surfaces on the hub and on the gear. The frictional connection thus established between the gear 40 and the hub 42 is the only driving connection that is required between the hub 42 and the gear 40. This frictional connection makes it unnecessary to use driving spline teeth or keyways which could be destroyed due to the repeated crankshaft vibrations and firing torques to which the crankshaft gear and the gear 40 are subjected.

The gear 40 comprises a peripheral portion 166 having formed thereon bevel gear teeth 168. It includes also a secondary peripheral portion 170 on which is formed bevel gear teeth 172. Gear teeth 172 and gear teeth 168 are disposed in aligned relationship to define single continuous gear teeth.

Bevel gear portion 170 has a pilot hub 174 supported on an annular pilot portion 176 extending toward the engine from the hub 178 of the gear 40. Snap ring 180 maintains the bevel gear portions 172 and 166 in assembled relationship.

The registering surfaces 182 and 184 of the bevel gear portions 166 and 170, respectively, define an annular cavity in which is positioned a flat C-spring 186. The C-spring is illustrated in FIGS. 7 and 8.

Adjacent ends of the C-spring 186, as shown at 188 and 190, are apertured to receive dowel pins 192 and 194. As seen in FIG. 8, these pins extend in opposite directions. As indicated in FIG. 5, dowel pins 192 and 194 are received in cooperating openings formed in the bevel gear portions 166 and 170, respectively.

C-spring 186 is of rectangular cross-section, as indicated in FIG. 5. When the gear teeth 172 and 168 are aligned, the C-spring will be stressed, thus providing a continuous torque on the gear portions 166 an 170. When the gear teeth 172 and 168 are aligned, dowel pin 196 may be inserted through cooperating dowel openings formed in the gear portions 170 and 166, as indicated in FIG. 5.

Shown also in FIG. 5 are lock bolts 198 which hold the gear portions 170 and 166 in a fixed position, one with respect to the other when the bevel gear teeth 172 and 168 are machined. Both gear portions 172 and 168 are machined as a single bevel gear in the same machining operation.

FIG. 6 shows the openings 200 and 202 for the dowel pins 194, 192, respectively. They are elongated to facilitate rapid assembly. After the machining operation is complete, the lock bolts 198 are removed. Following assembly, dowel pin 196 is removed, thereby permitting the C-spring to exert a tangential force tending to separate the teeth 172 with respect to the teeth 168 in a tangential direction. This effectively eliminates a backlash condition between the meshing bevel gear teeth of the gear 40 and the bevel gear teeth of the crankshaft gear 100.

To facilitate removal of the gear hub 178 from the shaft 42 during disassembly, I have provided a pressure passage 204. Passage 206 in the shaft 42 extends in an axial direction and communicates with passage 204, the latter extending radially to a location intermediate the axial ends of the hub 178. To disassemble the hub 178 from shaft 42, lock nut 164 can be removed and pressurized fluid can be supplied to passage 206, thereby establishing a hydraulic force that separates the hub 178 from the shaft 42.

Shown in FIG. 5 is the main bearing 208 for supporting the shaft 42. The bearing support for the bearing 208 is identified by reference number 210. This forms a part of the cylinder housing 10. A suitable seal may be used as shown in FIG. 5 at 212, which isolates the interior of the engine crankcase from the interior of the torque converter housing. A corresponding seal is located adjacent the bearing for shaft 42 as seen in FIG. 1. Thus, the crankshaft gear and the bevel gear with which it meshes are effectively lubricated with engine oil with no cross-flow of the transmission fluid and engine lubrication oil.

Having described a preferred form of my invention, what I claim and desire to secure by U.S. Letters Patent is:

1. A T-drive for a front-wheel drive vehicle having an internal combustion engine with a crankshaft having an axis disposed transversely with respect to a fore-and-aft vehicle geometric axis, said vehicle having front drive traction wheels;

a transmission having multiple ratio gearing, a power input shaft connected drivably to power input portions to said multiple ratio gearing, a power output shaft drivably connected to power output portions of said gearing and adapted to transfer torque to said front drive traction wheels;

cross-axis gearing drivably connecting said crankshaft to said power input portions of said multiple ratio gearing comprising a drive gear connected directly to said crankshaft intermediate its ends and a driven gear engaging said drive gear, said driven gear being drivably connected to said power input shaft;

said crankshaft having multiple crank portions, said drive gear being mounted on one axial side of one of said crank portions, said driven gear being mounted for rotation in the plane of motion of said one crank portion with its axis of rotation transversely disposed with respect to said crankshaft axis, the pitch diameter of said drive gear being larger than the radial extent of the path of movement of said one crank portion whereby interference between said driven gear and said one crank portion is avoided;

the driving connection between said power input shaft and said driven gear comprising a hydrokinetic unit having an impeller, a turbine and a housing enclosing said impeller and said turbine, said hydrokinetic unit together with said power input shaft and said power input portions of said gearing contributing to form an effective rotary inertia mass at said intermediate crankshaft location;

said transmission power output shaft extending toward said driven gear;

a final transaxle gear drive located between said engine and said transmission having differential gearing with axle drive gears, a geared connection between said power output shaft and separate ones of said axle drive gears, each axle drive gear being adapted to be connected drivably to an axle shaft for said front traction wheels;

said driven gear and said crankshaft drive gear having conjugate bevel teeth;

one gear of said cross-axis gearing having two cooperating bevel gear portions, means for piloting and supporting one gear portion for angular movement relative to the other whereby a small degree of relative angular displacement may be accommodated; and spring means for applying a torque to said gear portions tending to displace angularly one gear portion relative to the other thereby eliminating backlash.

2. The combination as set forth in claim 1 wherein said transmission has a gear mounting shaft, said mounting shaft having two axially spaced bearing supports, one bearing support being disposed on the engine crankshaft side of said driven gear and the other being located on the opposite side of said driven gear whereby said driven gear is straddle mounted and thus is adapted for accommodating engine torsional vibration.

3. A powertrain for a wheeled vehicle with front traction wheels comprising an internal combustion engine and a multiple ratio transmission, said engine and transmission including a common, multiple-part housing, said engine having a crankshaft adapted to be mounted transversely with respect to a fore-and-aft geometric center plane for said vehicle;

said transmission having a power output shaft extending toward said crankshaft in a substantially perpendicular direction with respect to the axis of said crankshaft; a final transaxle gear drive located between said engine and said transmission having differential gearing with axle drive gears, a geared connection between power output portions of said transmission and separate ones of said axle drive gears, each axle drive gear being adapted to be connected drivably to an axle shaft for said front traction wheels; and cross-axis gearing including a bevel drive gear connected to and rotatable with said crankshaft at a position on said crankshaft intermediate its ends and a bevel driven gear meshing with said bevel drive gear, said bevel driven gear being drivably connected to power input portions of said transmission and being disposed substantially at a right angle with respect to said crankshaft;

said crankshaft having multiple crank portions, said drive gear being mounted on one axial side of one of said crank portions, said driven gear being mounted for rotation in the plane of motion of said one crank portion with its axis of rotation transversely disposed with respect to said crankshaft axis, the pitch diameter of said drive gear being larger than the radial extend of the path of movement of said one crank portion whereby interference between said driven gear and said one crank portion is avoided;

the driving connection between said power input portions and said driven gear comprising a hydrokinetic unit having an impeller, a turbine and a housing enclosing said impeller and said turbine, said hydrokinetic unit together with said power input portions of said transmission contributing to form an effective rotary inertia mass at said intermediate crankshaft location;

said bevel drive gear and said bevel driven gear having meshing, cross-axis bevel gear teeth;

said driven gear comprising a gear hub, said power input shaft having a portion with a tapered section, said driven gear having a tapered gear hub opening registering with said input shaft tapered section, and means for securing said driven gear hub and said input shaft in frictional driving relationship.

4. An engine and transmission assembly for a wheeled vehicle with front traction wheels comprising an internal combustion engine with a cylinder housing and a crankshaft having multiple crank portions and multiple bearing portions adjacent the crank portions for journalling said crankshaft for rotation about an axis transverse to a fore-and-aft center plane for said vehicle;

a transmission having gearing arranged on a gearing axis generally on said vehicle center plane, said transmission having a housing joined to said cylinder housing to form a unitary T-drive assembly;

a torque input driven gear drivably connected to torque input portions of said transmission, torque output portions of said transmission being adapted to deliver torque to said vehicle front traction wheels;

said torque output portions of said transmission including a torque output shaft extending in a direction generally perpendicular to the axis of said crankshaft;

a final transaxle gear drive located between said engine and said transmission having differential gearing with axle drive gears, a geared connection between said torque output shaft and separate ones of said axle drive gears, each axle drive gear being adapted to be connected drivably to an axle shaft for said front traction wheels;

a crankshaft drive gear connected to said crankshaft intermediate the crankshaft ends directly adjacent one of said bearing portions, said crankshaft drive gear being drivably engaged with said torque input driven gear whereby the overall length of said unitary T-drive assembly is minimized and whereby the height of said engine is lowered relative to the axis of said gearing;

said crankshaft having multiple crank portions, said drive gear being mounted on one axial side of one of said crank portions, said driven gear being mounted for rotation in the plane of motion of said one crank portion with its axis of rotation transversely disposed with respect to said crankshaft axis, the pitch diameter of said drive gear being larger than the radial extent of the path of movement of said one crank portion whereby interference between said driven gear and said one crank portion is avoided; and the driving connection between said torque input portions and said driven gear comprising a hydrokinetic unit having an impeller, a turbine and a housing enclosing said impeller and said turbine, said hydrokinetic unit together with said torque input portions of said transmission contributing to form an effective rotary inertia mass at said intermediate crankshaft location;

said driven gear and said drive gear having conjugate bevel teeth and defining a cross-axis drive;

one gear of said cross-axis drive having two cooperating bevel gear portions, means for piloting and supporting one gear portion for angular movement relative to the other whereby a small degree of relative angular displacement may be accommodated; and spring means for applying a torque to said gear portions tending to displace one gear portion relative to the other thereby eliminating backlash;

said driven gear comprising a gearing hub, said torque input portions including a torque input shaft having a portion with a tapered section, said driven gear having a tapered gear hub opening registering with said input shaft tapered section, and means for securing said driven gear hub and said input shaft in frictional driving relationship.

* * * * *